(12) United States Patent
Tajima et al.

(10) Patent No.: US 8,607,078 B2
(45) Date of Patent: Dec. 10, 2013

(54) ELECTRIC POWER SUPPLY DEVICE, ELECTRIC POWER SUPPLY METHOD AND ELECTRIC POWER SUPPLY SYSTEM

(75) Inventors: Shigeru Tajima, Kanagawa (JP); Kenji Fujita, Chiba (JP)

(73) Assignee: Sony Corporation, Tokyo (JP)

( * ) Notice: Subject to any disclaimer, the term of this patent is extended or adjusted under 35 U.S.C. 154(b) by 419 days.

(21) Appl. No.: 12/950,258

(22) Filed: Nov. 19, 2010

(65) Prior Publication Data

US 2011/0131429 A1 Jun. 2, 2011

(30) Foreign Application Priority Data

Nov. 27, 2009 (JP) ................................. 2009-270642

(51) Int. Cl.
*G06F 1/26* (2006.01)
*G06F 1/32* (2006.01)

(52) U.S. Cl.
USPC ........... 713/300; 713/310; 713/330; 713/340; 700/286

(58) Field of Classification Search
USPC .................... 713/300, 310, 330, 340; 700/286
See application file for complete search history.

(56) References Cited

U.S. PATENT DOCUMENTS

| 5,783,927 | A  | * | 7/1998 | Chen ............................. | 320/110 |
|-----------|----|---|--------|-------------------------------------|---------|
| 6,191,552 | B1 | * | 2/2001 | Kates et al. ..................... | 320/112 |
| 6,653,932 | B1 | * | 11/2003 | Beamish et al. ............. | 455/3.01 |
| 8,212,380 | B2 | * | 7/2012 | Okada ............................... | 307/2 |
| 2009/0210737 | A1 | * | 8/2009 | Tajima et al. ................. | 713/340 |
| 2010/0277294 | A1 | * | 11/2010 | Tajima ..................... | 340/310.11 |
| 2011/0098865 | A1 | * | 4/2011 | Kitano et al. ................. | 700/286 |
| 2011/0107119 | A1 | * | 5/2011 | Tajima ......................... | 713/300 |
| 2011/0112700 | A1 | * | 5/2011 | Tajima ......................... | 700/293 |
| 2011/0131429 | A1 | * | 6/2011 | Tajima et al. ................. | 713/310 |
| 2011/0161687 | A1 | * | 6/2011 | Tajima ......................... | 713/300 |
| 2011/0233997 | A1 | * | 9/2011 | Tajima ......................... | 307/9.1 |
| 2011/0233998 | A1 | * | 9/2011 | Tajima ......................... | 307/18 |
| 2012/0185708 | A1 | * | 7/2012 | Rekimoto et al. ............ | 713/310 |

FOREIGN PATENT DOCUMENTS

| JP | 3-245743 | * 11/1991 | ............. H02J 13/00 |
| JP | 2001-306191 | 11/2001 | |
| JP | 2008-123051 | 5/2008 | |
| JP | 2010-75029 | * 4/2010 | ............... H02J 4/00 |

OTHER PUBLICATIONS

U.S. Appl. No. 12/891,010, filed Sep. 27, 2010, Tajima.
U.S. Appl. No. 12/917,816, filed Nov. 2, 2010, Tajima.

* cited by examiner

*Primary Examiner* — Tanh Nguyen
(74) *Attorney, Agent, or Firm* — Sony Corporation

(57) ABSTRACT

There is provided an electric power supply device including an electric power supply portion that continuously supplies, to another device with which an agreement about electric power supply has been made, electric power agreed with the other device until one of a time at which the agreement becomes unnecessary and a time determined in advance, the electric power being supplied via a bus line formed by a pair of conductors, and an information communication portion that transmits and receives an information signal indicating information to and from the other device to which the electric power supply portion supplies the electric power, such that the information signal is superimposed on the electric power supplied from the electric power supply portion. The electric power supply portion determines whether to change the electric power to be supplied, in accordance with one of connection of a new device to the bus line and disconnection of the new device from the bus line.

14 Claims, 7 Drawing Sheets

ELECTRIC POWER SUPPLY DEVICE, ELECTRIC POWER SUPPLY METHOD AND ELECTRIC POWER SUPPLY SYSTEM

BACKGROUND OF THE INVENTION

1. Field of the Invention

The present invention relates to an electric power supply device, an electric power supply method and an electric power supply system.

2. Description of the Related Art

For many electronic devices such as personal computers and game units, AC adapters are used that input alternating current (AC) electric power from a commercial electric power supply and output electric power that is matched to the devices, in order to operate the devices and charge their batteries. The electronic devices ordinarily operate on direct current (DC), but the voltages and currents vary according to the device. The standards for the AC adapters that output the electric power that is matched to the devices are therefore different for each device, and even AC adapters that have the same sort of shape are not interchangeable, which has created a problem in that the number of AC adapters has increased as the types of electronic devices have increased.

To address this problem, an electric power supply bus system has been proposed in which an electric power supply block that supplies electric power to devices such as a battery, an AC adapter, and the like, and an electric power consumption block to which the electric power from the electric power supply block is supplied are connected to single, common direct current bus line (refer, for example, to Japanese Patent Application Publication No. JP-A-2001-306191 and Japanese Patent Application Publication No. JP-A-2008-123051). In the electric power supply bus system, direct current electricity flows through the bus line. Furthermore, in the electric power supply bus system, each of the blocks describes itself as an object, and the objects for the respective blocks reciprocally transmit and receive information (status data) through the bus line. The object for each of the blocks also creates information (status data) based on a request from the object for the other block and transmits the created information as reply data. The object for the block that receives the reply data can then control the supply and the consumption of the electric power based on the content of the received reply data.

In the electric power supply bus system proposed in Japanese Patent Application Publication No. JP-A-2001-306191 and Japanese Patent Application Publication No. JP-A-2008-123051, a single wired electric power line is used as an electric power supply line and also as a signal line, and electric power and signals are frequency-divided while they are time-divided with respect to the electric power supply. This is because electric power with different specifications (namely, different voltages including AC and DC) is transmitted and received from pier to pier through the single bus line.

SUMMARY OF THE INVENTION

However, in the electric power supply bus system proposed in Japanese Patent Application Publication No. JP-A-2008-123051, information and electric power are multiplexed, and electric power is supplied from an electric power supply server to clients in a time division manner. Therefore, if an electric power storage device, such as a battery, is not provided on the client side, the supply of electric power is interrupted. Further, as the number of the electric power supply servers and the clients increases, the number of time slots that can be occupied by one device decreases. As a result, there is a limit to the amount of electric power that can be supplied.

In light of the foregoing, it is desirable to provide an electric power supply device, an electric power supply method and an electric power supply system that are new and improved and that are capable of receiving supply of electric power from an electric power supply server even when an electric power storage device such as a battery is not provided, and also capable of connecting a chosen number of electric power supply sources (electric power supply servers) and loads (clients) to a bus line at a chosen timing, in an electric power supply bus system in which information and electric power are multiplexed.

According to an embodiment of the present invention, there is provided an electric power supply device including an electric power supply portion that continuously supplies, to another device with which an agreement about electric power supply has been made, electric power agreed with the other device until one of a time at which the agreement becomes unnecessary and a time determined in advance, the electric power being supplied via a bus line formed by a pair of conductors, and an information communication portion that transmits and receives an information signal indicating information to and from the other device to which the electric power supply portion supplies the electric power, such that the information signal is superimposed on the electric power supplied from the electric power supply portion. The electric power supply portion determines whether to change the electric power to be supplied, in accordance with one of connection of a new device to the bus line and disconnection of the new device from the bus line.

The electric power supply portion may determine, with the other device with which the agreement has first been made, an initial voltage and current of the electric power to be supplied. When the new device is connected to the bus line and an agreement on electric power supply is made with the new device, the electric power supply portion may transmit electric power agreed with the new device such that the electric power agreed with the new device is superimposed on the electric power agreed with the other device.

The electric power supply device may further include a detection portion that detects voltage and current of the bus line.

The electric power supply device may further include a current backflow prevention portion that inhibits backflow of current to the electric power supply portion.

The electric power supply portion may supply the electric power agreed with the other device in an electric power supply time interval that is determined in advance and periodically repeated.

According to another embodiment of the present invention, there is provided an electric power supply method, including the steps of continuously supplying, to another device with which an agreement on electric power supply has been made, electric power agreed with the other device until one of a time at which the agreement becomes unnecessary and a time determined in advance, the electric power being supplied via a bus line formed by a pair of conductors, and transmitting and receiving an information signal indicating information to and from the other device that is supplied with the electric power by the electric power supplying step such that the information signal is superimposed on the electric power supplied by the electric power supplying step. The electric power supplying step determines whether to change the electric power to be supplied, in accordance with one of connection of a new device to the bus line and disconnection of the new device from the bus line.

According to another embodiment of the present invention, there is provided an electric power supply system including at least one electric power supply server that supplies electric power, and at least one client that receives the electric power supplied from the electric power supply server. The electric power supply server includes an electric power supply portion that continuously supplies, to the client with which an agreement on electric power supply has been made, electric power agreed with the client until one of a time at which the agreement becomes unnecessary and a time determined in advance, the electric power being supplied via a bus line formed by a pair of conductors, and an information communication portion that transmits and receives an information signal indicating information to and from the client to which the electric power supply portion supplies the electric power such that the information signal is superimposed on the electric power supplied from the electric power supply portion. The electric power supply portion determines whether to change the electric power to be supplied, in accordance with one of connection of a new electric power supply server or a new client to the bus line and disconnection of the new electric power supply server or the new client from the bus line.

According to the aspects of the present invention described above, it is possible to provide an electric power supply device, an electric power supply method and an electric power supply system that are new and improved and that are capable of receiving supply of electric power from an electric power supply server even when an electric power storage device such as a battery is not provided, and also capable of connecting a chosen number of electric power supply sources (electric power supply servers) and loads (clients) to a bus line at a chosen timing, in an electric power supply bus system in which information and electric power are multiplexed.

DETAILED DESCRIPTION OF THE EMBODIMENT(S)

Figure 1:
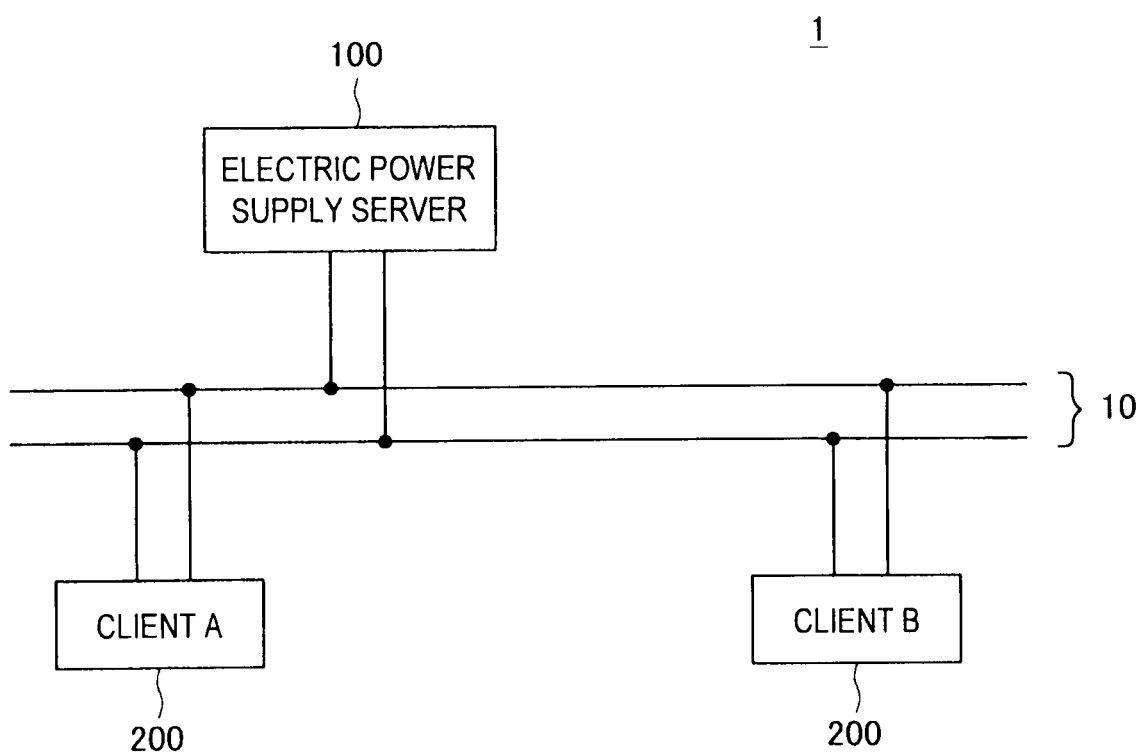
FIG. 1 is an explanatory figure that shows a configuration of an electric power supply system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the explanation will be in the order shown below.
1. Embodiment of the present invention
1-1. Configuration of electric power supply system
1-2. Known electric power supply processing by electric power supply system
1-3. Configuration of electric power supply server
1-4. Configuration of client
1-5. Operation of electric power supply system
2. Conclusion
1. Embodiment Of The Present Invention
1-1. Configuration of Electric Power Supply System First, a configuration of an electric power supply system 1 according to an embodiment of the present invention will be explained. FIG. 1 is an explanatory figure that shows the configuration of the electric power supply system 1 according to the embodiment of the present invention. Hereinafter, the configuration of the electric power supply system 1 according to the embodiment of the present invention will be explained using FIG. 1.

As shown in FIG. 1, the electric power supply system 1 according to the embodiment of the present invention is configured such that it includes an electric power supply server 100 and clients 200. The electric power supply server 100 and the clients 200 are connected through a bus line 10.

The electric power supply server 100 supplies direct current electric power to the clients 200. The electric power supply server 100 also transmits and receives information signals to and from the clients 200. In the present embodiment, the supplying of the direct current electric power and the transmitting and the receiving of the information signals between the electric power supply server 100 and the clients 200 both use the bus line 10.

The electric power supply server 100 is configured such that it includes a communication modem for the transmitting and the receiving of the information signals, a microprocessor for controlling the supplying of the electric power, a switch that controls the output of the direct current electric power, and the like.

The clients 200 receive the supply of the direct current electric power from the electric power supply server 100. The clients 200 also transmit and receive the information signals to and from the electric power supply server 100. Two of the clients 200 are shown in FIG. 1. Hereinafter, in order to simplify the explanation, the two clients 200 are distinguished as CL1 and CL2, respectively.

Each of the clients 200 is configured such that it includes a communication modem for the transmitting and the receiving of the information signals, a microprocessor for controlling the supplying of the electric power, a switch that controls the output of the direct current electric power, and the like.

Note that in the electric power supply system 1 that is shown in FIG. 1, the one electric power supply server 100 and the two clients 200 are shown, but in the present invention, the number of the electric power supply servers and the number of the clients are obviously not limited to this example.

A known method for supplying the electric power proposed in the electric power supply system 1 that is shown in FIG. 1 has been described in Japanese Patent Application Publication No. JP-A-2008-123051, so a detailed explanation will be omitted here, but known electric power supply processing by the electric power supply system I will hereinafter be explained briefly.

1-2. Known Electric Power Supply Processing by Electric Power Supply System

Figure 2:
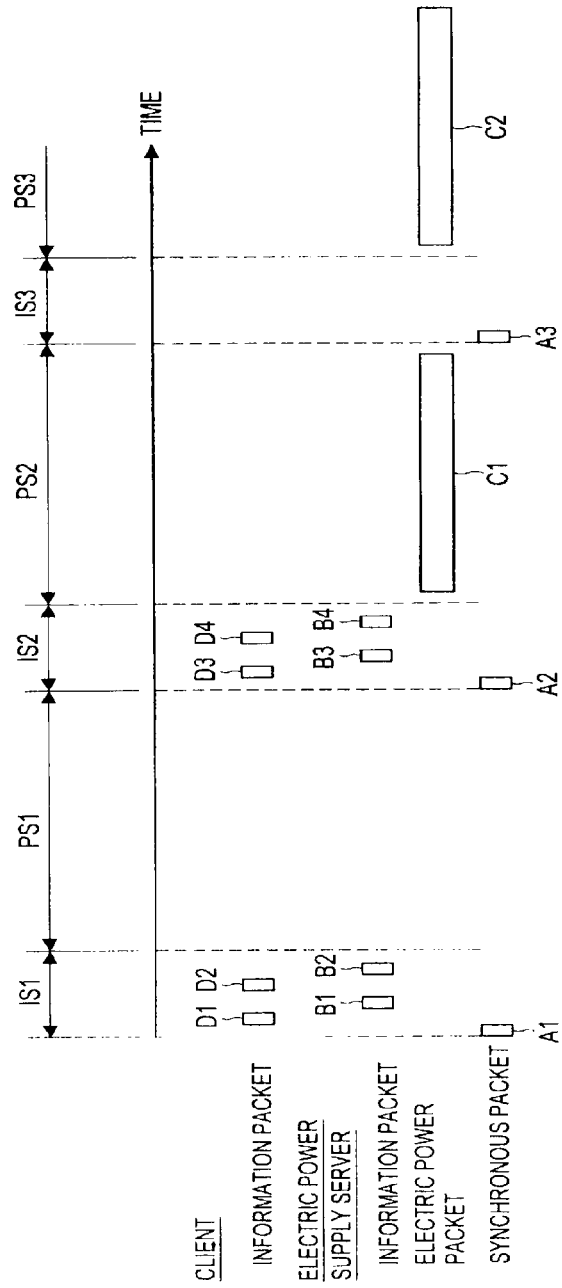
FIG. 2 is an explanatory figure that illustrates known electric power supply processing by the electric power supply system.

FIG. 2 is an explanatory figure that illustrates the known electric power supply processing by the electric power supply system 1. Hereinafter, the known electric power supply processing by the electric power supply system 1 will be explained using FIG. 2.

As shown in FIG. 2, the electric power supply server 100 outputs synchronization packets A1, A2, A3, and the like to the bus line 10 at regular intervals. Furthermore, in order to supply the electric power to the clients CL1, CL2, the electric power supply server 100 outputs information packets B1, B2, B3, and the like that are the information signals that are transmitted to the clients CL1, CL2, as well as electric power packets C1, C2, C3, and the like. For their part, the clients CL1, CL2, in order to receive the supply of the electric power from the electric power supply server 100, output information packets D1, D2, D3, and the like that are the information signals that are transmitted to the electric power supply server 100.

The electric power supply server 100 outputs the synchronization packets A1, A2, A3, and the like when time slots that are specified intervals (for example, one-second intervals) start. Each of the time slots includes an information slot during which the information packets are transmitted and an electric power supply slot during which one of the electric power packets is transmitted. Information slots IS1, IS2, IS3, and the like are intervals during which the information packets are exchanged between the electric power supply server 100 and the clients CL1, CL2. Electric power supply slots PS1, PS2, PS3, and the like are intervals during which the electric power packets C1, C2, C3, and the like that are supplied from the electric power supply server 100 to the clients CL1, CL2 are output. The information packets are packets that can be output only in the intervals that are designated as information slots IS1, IS2, IS3, and the like. Therefore, in a case where the transmitting and the receiving of an information packet is not completed within a single information slot, the information packet is transmitted across a plurality of the information slots. For their part, the electric power packets are packets that can be output only in the intervals that are designated as electric power supply slots PS1, PS2, PS3, and the like.

The electric power supply server 100 has at least one server electric power profile that indicates the specifications of the electric power that it is capable of supplying, and the clients CL1, CL2 receive the electric power from the electric power supply server 100, which is capable of supplying electric power that conforms to the specifications of the clients CL1, CL2. When receiving the electric power, the clients CL1, CL2 acquire the server electric power profile from the electric power supply server 100 and determine the specifications (the server electric power profile) of the electric power supply server 100 with respect to the clients CL1, CL2. In order to do that, the clients CL1, CL2 first detect the synchronization packet A1 that the electric power supply server 100 outputs and acquire an address for the electric power supply server 100 that is contained in the synchronization packet A1. The address can be a MAC address, for example. Next, each of the clients CL1, CL2 transmits the information packet D1, which requests the electric power supply server 100 to transmit the number of the server electric power profiles that it has.

Having received the information packet D1, the electric power supply server 100 transmits, in the information packet B1, the number of the server electric power profiles, which is the number of the server electric power profiles that the electric power supply server 100 has. Having received the information packet B1, each of the clients CL1, CL2 acquires from the electric power supply server 100 the server electric power profile contents for the number of the server electric power profiles that the electric power supply server 100 has. For example, in a case where the electric power supply server 100 has two server electric power profiles, each of the clients CL1, CL2 first acquires the first server electric power profile. Having acquired the first server electric power profile, each of the clients CL1, CL2 transmits the information packet D2 to the electric power supply server 100 to request use of the electric power supply.

Having received the two information packets D2, the electric power supply server 100 transmits to each of the clients CL1, CL2 the information packet B2, which is the first server electric power profile that is stored in a storage portion (not shown in the drawings) that is provided in the interior of the electric power supply server 100. Having received the information packet B2 from the electric power supply server 100, each of the clients CL1, CL2 transmits an information packet for acquiring the second server electric power profile. However, at this time, the information slot IS1 has ended, and the electric power supply slot PS1 for transmitting the electric power packet has started. Therefore, the information packets will be transmitted in the next information slot IS2. Meanwhile, in the electric power supply slot PS1, the electric power is not supplied, because the clients CL1, CL2 have not determined the specifications for the electric power they will receive from the electric power supply server 100.

The electric power supply slot PS1 ends, and the synchronization packet A2 that indicates the start of the next time slot is output from the electric power supply server 100. Then, each of the clients CL1, CL2, having received the information packet B2 from the electric power supply server 100, transmits the information packet D3, which is information for acquiring the second server electric power profile.

Having received the two information packets D3, the electric power supply server 100 transmits to each of the clients CL1, CL2 the information packet B3, which is the second server electric power profile that is stored in the storage portion (not shown in the drawings) that is provided in the interior of the electric power supply server 100. Having received the information packet B3 and acquired the second server electric power profile that the electric power supply server 100 has, each of the clients CL1, CL2 selects the server electric power profile for the appropriate electric power supply specifications. Each of the clients CL1, CL2 then transmits the information packet D4 to the electric power supply server 100 to set the selected server electric power profile.

Having received the two information packets D4, the electric power supply server 100, in order to notify each of the clients CL1, CL2 that the first server electric power profile has been set, transmits to each of the clients CL1, CL2, in the form of the information packet B4, information that expresses a reply to the effect that the electric power specifications have been set. Then, when the information slot IS2 ends and the electric power supply slot PS2 starts, the electric power supply server 100 outputs the electric power packet C1 to and supplies the electric power to each of the clients CL1, CL2. Note that by using information that expresses a request to set the transmission start time, the clients CL1, CL2 can specify to the electric power supply server 100 the time at which to start supplying the electric power, that is, the time at which to transmit the electric power packet.

The known electric power supply processing by the electric power supply system 1 has been explained above. In this manner, with the proposed known technique, a single wired electric power line is used as an electric power supply line and also as a signal line, and electric power and signals are frequency-divided while they are time-divided with respect to the electric power supply. However, as described above, in the proposed known electric power supply bus system in which information and electric power are multiplexed, electric power is supplied from the electric power supply server to the clients in a time division manner. Therefore, if an electric power storage device, such as a battery, is not provided on the client side, the supply of electric power is interrupted. Further, as the number of the electric power supply servers and the clients increases, the number of time slots that can be occupied by one device decreases. As a result, there is a limit to the amount of electric power that can be supplied.

In order to solve the problems in the proposed known technique, the present embodiment has the following key features. Electric power is supplied without interruption between a particular electric power supply server and a particular client between which electric power is supplied and received. Further, simultaneous connection between a plurality of servers and clients is enabled. Moreover, the present embodiment also has the key feature of the proposed known technique, namely, the feature that the electric power supply server and the client can be connected at a chosen timing.

1-3. Configuration of Electric Power Supply Server

Figure 3:
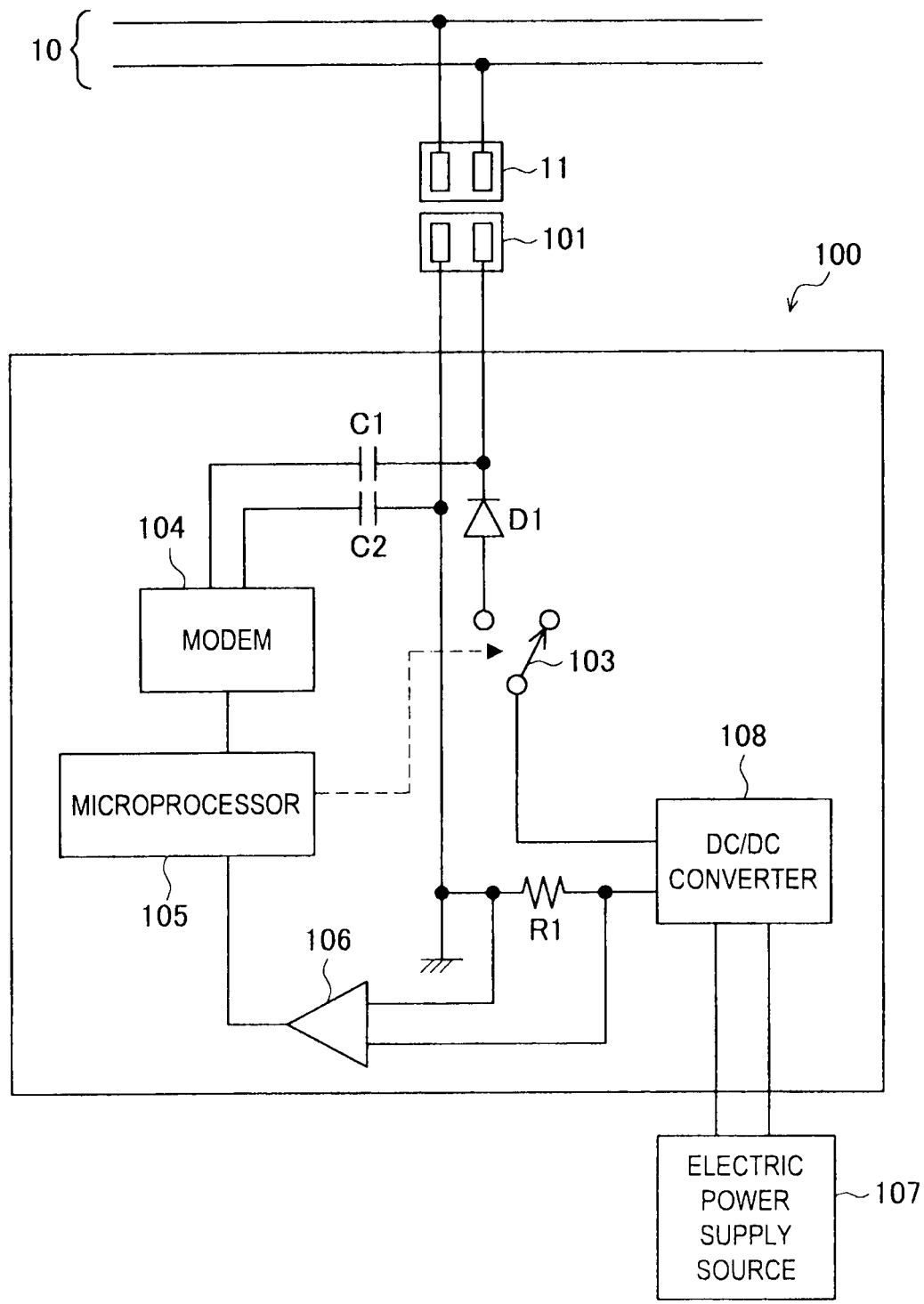
FIG. 3 is an explanatory figure that shows a configuration of an electric power supply server according to the embodiment of the present invention.

First, the configuration of the electric power supply server 100 according to the embodiment of the present invention will be explained. FIG. 3 is an explanatory figure that shows the configuration of the electric power supply server 100 according to the embodiment of the present invention. Hereinafter, the configuration of the electric power supply server 100 according to the embodiment of the present invention will be explained with reference to FIG. 3.

As shown in FIG. 3, the electric power supply server 100 according to the embodiment of the present invention is configured such that it includes a connector 101, connecting lines 102, 106, a main switch 103, a modem 104, a microprocessor 105, an electric power supply source 107, a DC/DC converter 108, a current detection amplifier 109, a register R1 and a diode D1.

The connector 101 connects the main body of the electric power supply server 100 to the bus line 10 by connecting to a connector 11 of the bus line 10. The connecting lines 102 connect the connector 101 to the main body of the electric power supply server 100. The main switch 103 controls the output of the electric power, and if the main switch 103 is on, the electric power supply server 100 supplies the electric power from the electric power supply source 107 to the bus line 10. On the other hand, if the main switch 103 is off, the electric power supply server 100 can stop the supplying of the electric power from the electric power supply source 107.

The modem 104 performs transmission and receiving of information to and from other electric power supply servers and clients that are connected to the bus line 10. A high-frequency communication signal is transmitted from the modem 104 to the bus line 10, and the high-frequency communication signal that passes through the bus line 10 is received. Note that the capacitors C1, C2 are provided between the bus line 10 and the modem 104, and they prevent the direct current that flows through the bus line 10 from flowing to the modem 104.

The microprocessor 105 controls the operation of the electric power supply server 100. When the negotiation between the electric power supply server 100 and the client (for example, one of the clients 200 in FIG. 1) is completed, the microprocessor 105 turns the main switch 103 on in order to supply the electric power from the electric power supply source 107.

The connecting lines 106 connect the electric power supply source 107 to the main body of the electric power supply server 100. The electric power supply source 107 can supply the electric power in the form of a direct current voltage, and when the main switch 103 of the electric power supply server 100 is turned on, the electric power supply source 107 can supply the direct current electric power to the bus line 10. For example, a solar light panel that generates electric power by irradiation of sunlight may be used as the electric power supply source 107.

The DC/DC converter 108 converts the voltage of the electric power supplied from the electric power supply source 107 to an appropriate voltage. The voltage conversion by the DC/DC converter 108 makes it possible to supply electric power at a voltage that matches the request from the client that receives the supply of the electric power from the electric power supply server 100. Note that the DC/DC converter 108 may be a step-down DC/DC converter that has an input range of about 7V to 30V, for example.

The current detection amplifier 109 detects an output current value from the DC/DC converter 108 by amplifying voltages at both ends of the register R1. The output current value from the DC/DC converter 108 can be detected by using both the current detection amplifier 109 and the register R1 together. The output current value from the DC/DC converter 108 that is detected by the current direction amplifier 109 is sent to the microprocessor 105, and it can be used to control the supply of the electric power to the electric power supply system 1.

The diode D1 is provided to inhibit backflow of current. Flow of current into the electric power supply source 107 can be inhibited by the diode D1. Note that, in the example shown in FIG. 3, the diode is used to inhibit backflow of current. However, in the present invention, a switching device other than the diode may be used as a device that inhibits backflow of current.

In summary, the electric power supply server 100 has the following functional elements (1) The DC/DC converter 108 that is used to convert the original electric power supply of the electric power supply source 107 of the electric power supply server 100 to a DC electric power supply with voltage specifications set in advance. Note that, when the electric power supply source 107 is an AC electric power supply, an AC/DC converter is used instead of the DC/DC converter 108. It is desirable that the output voltage from the DC/DC converter 108 (or the AC/DC converter) can be varied, and that a variable range of the output voltage is wide.

(2) A device that detects an output current of the DC/DC converter 108 (or the AC/DC converter). In the example shown in FIG. 3, the current detection amplifier 109 and the register R1 serve as the device that detects the output current of the DC/DC converter 108 (or the AC/DC converter).

(3) The diode D1 that is used to inhibit backflow, which is connected in series with the DC/DC converter 108 (or the AC/DC converter). Note that, as described above, in the present invention, a switching device other than the diode may be used as a device that inhibits backflow of current.

(4) The main switch 103 that is used to start and terminate the supply of the electric power from the electric power supply source 107 to the electric power supply system 1.

(5) The microprocessor 105 that stores protocols of the electric power supply system 1, and performs switching control of the main switch 103 and communication with another server (an electric power supply server or a synchronous server) and with a client.

(6) The modem 104 that is used to establish a signal link with another device in the electric power supply system 1.

After the electric power supply server 100 shown in FIG. 3 has completed the negotiation with a client that requires electric power, the electric power supply server 100 supplies electric power to the client without interruption, unlike the above-described electric power supply bus system proposed in Japanese Patent Application Publication No. JP-A-2008-123051.

The configuration of the electric power supply server 100 according to the embodiment of the present invention has been explained above using FIG. 3. Next, the configuration of the client 200 that receives the electric power supplied from the electric power supply server 100 will be explained.

1-4. Configuration of Client

Figure 4:
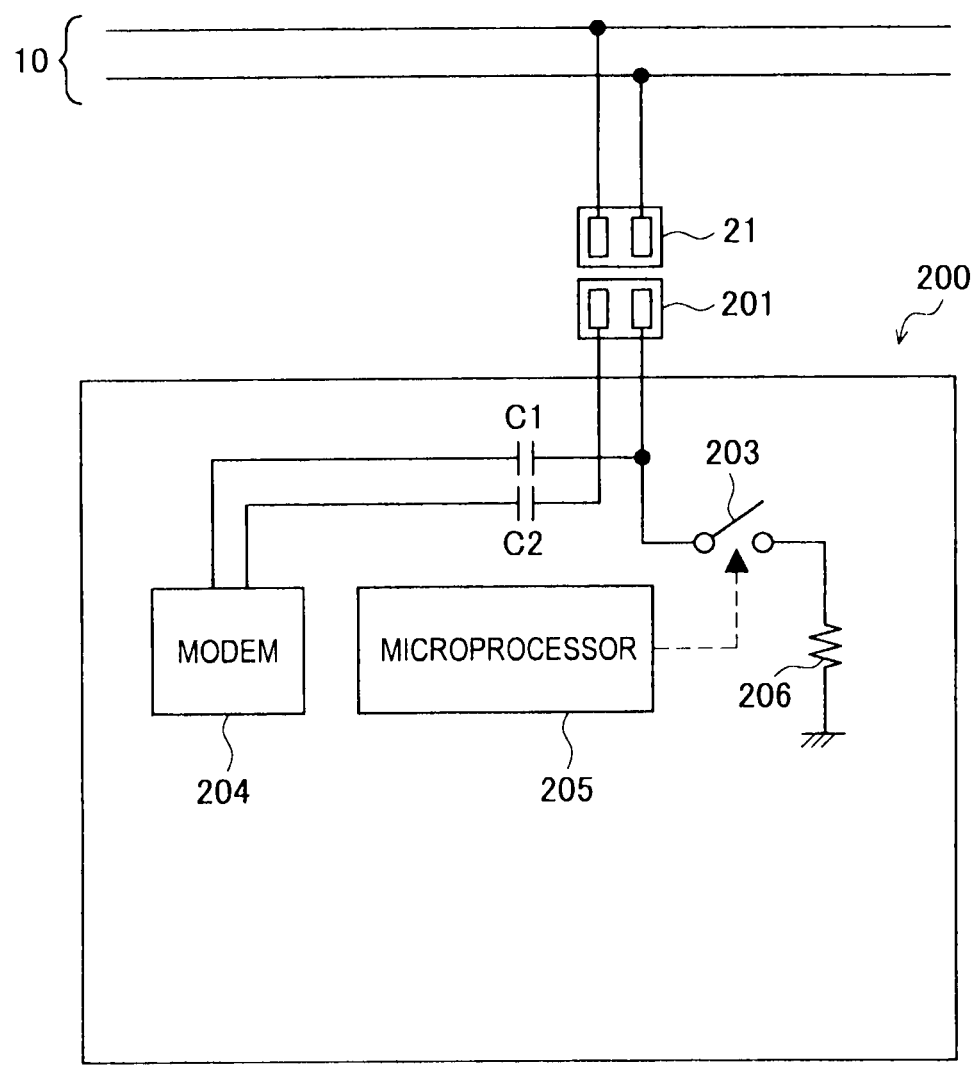
FIG. 4 is an explanatory figure that shows a configuration of a client according to the embodiment of the present invention.

FIG. 4 is an explanatory figure that shows the configuration of the client 200 according to the embodiment of the present invention. Hereinafter, the configuration of the client 200 according to the embodiment of the present invention will be explained using FIG. 4.

As shown in FIG. 4, the client 200 according to the embodiment of the present invention is configured such that it includes a connector 201, connecting lines 202, a main switch 203, a modem 204, a microprocessor 205 and a load 206.

The connector 201 connects the main body of the client 200 to the bus line 10 by connecting to a connector 21 of the bus line 10. The connecting lines 202 connect the connector 201 to the main body of the client 200. The main switch 203 controls the receiving of the electric power, and if the main switch 203 is on, the client 200 can receive the electric power that is supplied from the electric power supply server 100 through the bus line 10. On the other hand, if the main switch 203 is off, the client 200 can stop the receiving of the electric power that is supplied from the electric power supply server 100.

The modem 204 performs transmission and receiving of information to and from other electric power supply servers and clients that are connected to the bus line 10. A high-frequency communication signal is transmitted from the modem 204 to the bus line 10, and the high-frequency communication signal that passes through the bus line 10 is received. Note that the capacitors C1, C2 are provided between the bus line 10 and the modem 204, and they prevent the direct current that flows through the bus line 10 from flowing to the modem 204.

The microprocessor 205 controls the operation of the client 200. When the negotiation between the electric power supply server 100 and the client 200 is completed, the microprocessor 205 turns the main switch 203 on in order to receive the electric power from the electric power supply server 100.

The load 206 consumes the electric power that is received from the electric power supply server 100, and performs a primary role in the operation of the client 200.

In the known electric power supply bus system (proposed in Japanese Patent Application Publication No. JP-A-2008-123051, for example) in which information and electric power are multiplexed, the client 200 is provided with an electric power storage device such as a battery or a large capacity capacitor. As shown in FIG. 2, in the known electric power supply bus system in which information and electric power are multiplexed, there is a period (a guard period) during which electric power is not supplied. Therefore, the electric power storage device is provided to store electric power in order to ensure that electric power is not interrupted during the guard period.

Contrary to this, the client 200 shown in FIG. 4 is not provided with an electric power storage device for storing electric power. This is because, in the present embodiment, electric power is supplied from the electric power supply server 100 such that a dead time interval is not generated.

The configuration of the client 200 according to the embodiment of the present invention has been explained above. Next, an operation of the electric power supply system 1 according to the embodiment of the present invention will be explained.

1-5. Operation of Electric Power Supply System

Figure 5:
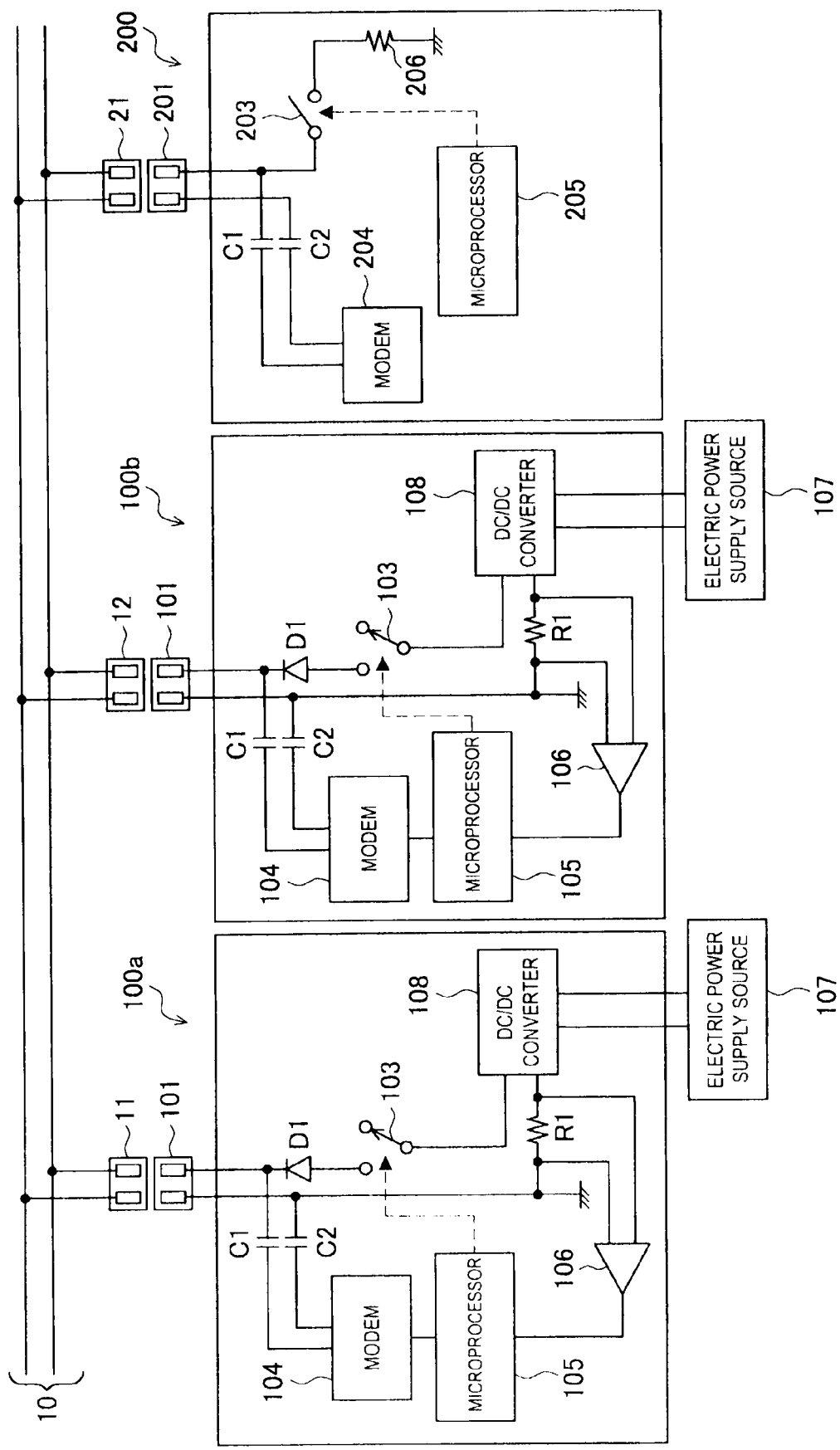
FIG. 5 is an explanatory figure that shows an operation of the electric power supply system according to the embodiment of the present invention.

FIG. 5 is an explanatory figure that shows the operation of the electric power supply system 1 according to the embodiment of the present invention. The explanatory figure shows, as an example, a case in which one client is provided with electric power from two electric power supply servers. Hereinafter, the operation of the electric power supply system 1 according to the embodiment of the present invention will be explained with reference to FIG. 5.

As shown in FIG. 5, when a plurality of electric power supply servers exist in the electric power supply system 1, as a first operation of the electric power supply system, selection of one synchronous server is started between the electric power supply servers. The selection is performed in the same manner as in the known electric power supply bus system (proposed in Japanese Patent Application Publication No. JP-A-2008-123051, for example) in which information and electric power are multiplexed. Therefore, a detailed explanation is omitted here. After the selection of the synchronous server has been completed between the electric power supply servers, the electric power supply server selected as the synchronous server performs management of the entire system until the synchronous server disconnects from the electric power supply system 1. Note that the disconnection of the synchronous server from the electric power supply system means that the server selected as the synchronous server is separated from the electric power supply system, and a synchronous packet is removed from the bus line 10.

Note that the electric power supply server selected as the synchronous server may supply a voltage that is appropriate for initial operations of a server and a client that will be connected to the bus line 10. However, here, the explanation will be given on the assumption that the voltage appropriate for the initial operations is not supplied.

Let us assume that, in a state where two electric power supply servers 100a, 100b are connected to the same bus line 10, the client 200 is connected to the bus line 10 as shown in FIG. 5. The electric power supply server 100a is connected to the bus line 10 by connecting to the connector 11, and the electric power supply server 100b is connected to the bus line 10 by connecting to a connector 12. The client 200, which has been connected to the bus line 10 by connecting to the connector 21, first negotiates with the electric power supply server 100a selected as the synchronous server, and acquires information about the electric power supply server existing on the bus line 10 from the electric power supply server 100a selected as the synchronous server. Note that acquisition processing of the information of the electric power supply server existing on the bus line 10, and negotiation processing between the electric power supply server and the client are also performed in the same manner as in the known electric power supply bus system (proposed in Japanese Patent Application Publication No. JP-A-2008-123051, for example) in which information and electric power are multiplexed. Therefore, a detailed explanation is omitted here. A negotiation request from the client 200 is sent by the microprocessor 205 to the electric power supply server 100a via the modem 204. The electric power supply server 100a sends the information about the electric power supply server existing on the bus line 10 from the microprocessor 105 to the client 200 via a modem 104. The client 200 sequentially requests the electric power supply servers 100a, 100b for the use of electric power, via the modem 204. Then, the microprocessor 205 of the client 200 determines one electric power supply server that can supply the necessary electric power, and the client 200 performs negotiation with the determined electric power supply server. It is assumed here that the client 200 successfully completes the negotiation with the electric power supply server 100a, and the electric power is transmitted from the electric power supply server 100a to the client 200.

Here, the electric power supply server 100a selected as the synchronous server generates time slots. The time slots are maintained until an electric power stop request is issued from the client 200 or until a time specified in advance. A guard period is not provided between the time slots, and electric power is continuously supplied from the electric power supply server without interruption. This is a significantly different point from the known electric power supply bus system (proposed in Japanese Patent Application Publication No. JP-A-2008-123051, for example) in which information and electric power are multiplexed.

More specifically, a key feature of the present embodiment is that, the time interval between the electric power packet C1 and the electric power packet C2 shown in FIG. 2, where the supply of electric power is not performed, is eliminated, and the supply of the electric power from the electric power supply server 100a is continued for a predetermined time period (namely, until the electric power stop request is issued from the client 200 or until the time specified in advance.)

In the present embodiment, the electric power specification that is negotiated between the electric power supply server 100a and the client 200 has the following contents, for example.

(1) maximum voltage, minimum voltage
(2) maximum current, minimum current

Of course, it is conceivable that the electric power specification includes information other than the above, such as billing information for an electric power bill. However, here, a case is explained in which only the above contents (1) and (2) are negotiated between the electric power supply server 100a and the client 200.

It is assumed that the electric power supply server 100a and the client 200 agree that electric power is supplied at a voltage V1 (volt) and a current I1 (ampere) from a certain time. In this case, from the agreed certain time, the electric power supply server 100a starts the supply of the electric power from the electric power supply source 107 to the client 200. By doing this, the voltage V1 that is output from the electric power supply server 100a appears on the bus line 10. When the microprocessor 205 of the client 200 confirms that the voltage V1 appears on the bus line 10, the microprocessor 205 of the client 200 turns on the main switch 203. Thus, the client 200 is ready to receive the electric power from the electric power supply server 100a. Then, the electric power supply server 100a supplies to the client 200 the electric power at the voltage V1 and the current I1 from the electric power supply source 107.

The current I1 is determined by the client 200, and the electric power supply server 100a sets the current limit value to I1+α (ampere). Accordingly, the electric power supply server 100a basically supplies a constant voltage. However, due to an influence of impedance of the bus line 10, for example, voltage variation appears on the client 200 due to increase/decrease of the current used by the client 200. Of course, it is assumed that the client 200 is designed not to be affected at all by the voltage variation. Further, it is easy to design hardware in this way. Therefore, specific design details are not explained here. Note that it is assumed that, normally, the current I1 is a value that is negotiated, as the maximum current value, between the electric power supply server 100a and the client 200.

If an end time of the supply of the electric power is not particularly specified between the electric power supply server 100a and the client 200, or if an end condition of the supply of the electric power is specified such that the supply of the electric power is terminated when an end request is issued from the client 200, the voltage from the electric power supply server 100a is constantly V1 and the current is approximately I1.

However, when the current capacity of the client 200 is insufficient given the electric power agreed with the electric power supply server 100a, the client 200 can request the electric power supply server 100a to increase the voltage or the current, from the microprocessor 205 via the modem 204. Having received the request from the client 200, the power supply server 100a detects an output current value from the DC/DC converter 108. When the electric power supply server 100a can respond to the request from the client 200, the microprocessor 105 determines a new specification, and electric power is supplied from the electric power supply source 107 in accordance with the determined specification. The new specification includes three cases: a case in which the voltage is increased while the current is unchanged; a case in which the current is increased while the voltage is unchanged; and a case in which both of the voltage and the current are increased.

On the other hand, as a result of detecting the output current value from the DC/DC converter 108, when the electric power supply server 100a cannot respond to the request from the client 200, the electric power supply server 100a transmits to the client 200 a reply stating that it cannot respond to the request from the client 200, from the microprocessor 105 via the modem 104. When the microprocessor 205 of the client 200 receives, via the modem 204, the information transmitted from the electric power supply server 100a, the client 200 can confirm that the electric power supply server 100a cannot respond to the request from the client 200. In this case, the client 200 knows that the other electric power supply server 100b exists on the bus line 10. This is because, when the client 200 is connected to the bus line 10, it acquires information about the electric power supply servers existing on the bus line 10 from the synchronous server. Further, the synchronous server constantly confirms addition of any clients and electric power supply servers to the electric power supply system 1, or separation thereof from the electric power supply system 1. If a change occurs in the electric power supply system 1, the synchronous server broadcasts the information about the change to the electric power supply system 1. The synchronous server can hold information that specifies the latest state of the system as parameters, which are received in a synchronous packet that is periodically transmitted. Examples of the information include the number of the electric power supply servers at the time of transmitting the packet, and ID information to identify the electric power supply servers.

When the electric power supply server 100a cannot respond to the request from the client 200, the microprocessor 205 of the client 200 starts negotiation with the other electric power supply server 100b via the modem 204, as to whether or not electric power to compensate for the insufficient amount of electric power can be supplied. Thus, as a result, the client 200 requests the electric power supply servers 100a, 100b to perform a parallel operation. Information about the insufficient amount of electric power is transmitted from the client 200 to the electric power supply server 100b, which will be a new electric power supply source. The electric power supply server 100b monitors the voltage of the bus line 10. Although not shown in FIG. 5, the voltage of the bus line 10 can be measured by providing a device that measures the voltage of an output end of the electric power supply server 100b through the microprocessor 105. It is needless to mention that the device may be provided in another electric power supply server. Accordingly, the electric power supply server 100b starts the supply of electric power to the bus line 10 in order to increase the output voltage to the bus line 10 based on the data detected at the register R1, such that the insufficient amount of electric power requested by the client 200 is compensated. Note that, at this time, there is almost no change in the voltage of the bus line 10, and the current from the electric power supply server 100b is newly supplied to the bus line 10. The electric power supplied respectively from the electric power supply servers 100a, 100b is added (via the diode D1). An insufficient current I2 is added while the voltage remains at V1, and thus an electric power of I1+I2 (ampere) is supplied to the client 200.

In this manner, when the current capacity of the client 200 is insufficient, electric power can be supplied from the other electric power supply server. With regard to this feature, the electric power supply system 1 according to the present embodiment is different from the known electric power supply bus system (proposed in Japanese Patent Application Publication No. JP-A-2008-123051, for example) in which information and electric power are multiplexed. Conversely, when the amount of the electric power consumption of the client 200 decreases in a state where the client 200 is supplied with the electric power from the electric power supply servers 100a, 100b, it is possible to switch to the supply of the electric power from either one of the electric power supply servers, or to reduce the amount of current supplied from both the electric power supply servers. Each of the electric power supply servers can be informed about the amount of current supplied from the server itself and the amount of current supplied from the other electric power supply server, by receiving a synchronous packet from the synchronous server. Therefore, the way in which the electric power to be supplied is allocated can be determined in various chosen ways. For example, a priority order may be determined in advance for the electric power supply servers, and the supply of electric power may be sequentially stopped from the electric power supply server with the lower priority. Alternatively, the supply of electric power may be sequentially stopped starting from electric power supply servers other than the electric power supply server with which the negotiation was completed first.

Note that, when the client 200 does not transmit an explicit request to reduce the amount of current, after reducing the supply amount of current from the electric power supply server 100b that has been added afterward, the supply from the electric power supply server 100b may be cut off. Then, the supply amount of current from the electric power supply server 100a may be reduced.

In this manner, the client 200 can increase or decrease the amount of current while maintaining the voltage V1 that has been agreed with the electric power supply server 100a initially. Of course, if the consumption current of the client 200 is equal to or less than a certain value, the amount of current from the electric power supply servers 100a, 100b may be changed dynamically. In this case, the voltage on the bus line 10 changes in accordance with the changes in the amount of current. As a matter of course, the client 200 is designed such that it can operate without a problem with respect to the changes.

The electric power supply system according to the present embodiment has the following key features. Firstly, all of the following determinations are made in advance by negotiation between an electric power supply server and a client: whether an electric power supply is connected in parallel to a particular load (the client); which electric power supply is connected in parallel; how to determine the current load; and how to set the voltage. Secondly, the supply of electric power is continuously performed without interruption until the client issues an end request or until a particular time limit that is set by the system. With respect to the voltage setting, it is easy to increase the voltage in order to increase the electric power. When the voltage has increased to a limit, the electric power can be increased by performing parallel control. In addition, when shifting from using a single electric power supply server to parallel control, the voltage may be reduced as appropriate. As a matter of course, the above-described control is performed such that the client to be supplied with electric power checks the capacity of each electric power supply server and determines which current is to be supplied from which electric power supply server.

In the example shown in FIG. 5, a case is shown in which one client receives the electric power from two electric power supply servers. Next, an operation example will be explained for a case in which, while one client is receiving the electric power from two electric power supply servers, a second client is connected to the bus line.

Figure 6:
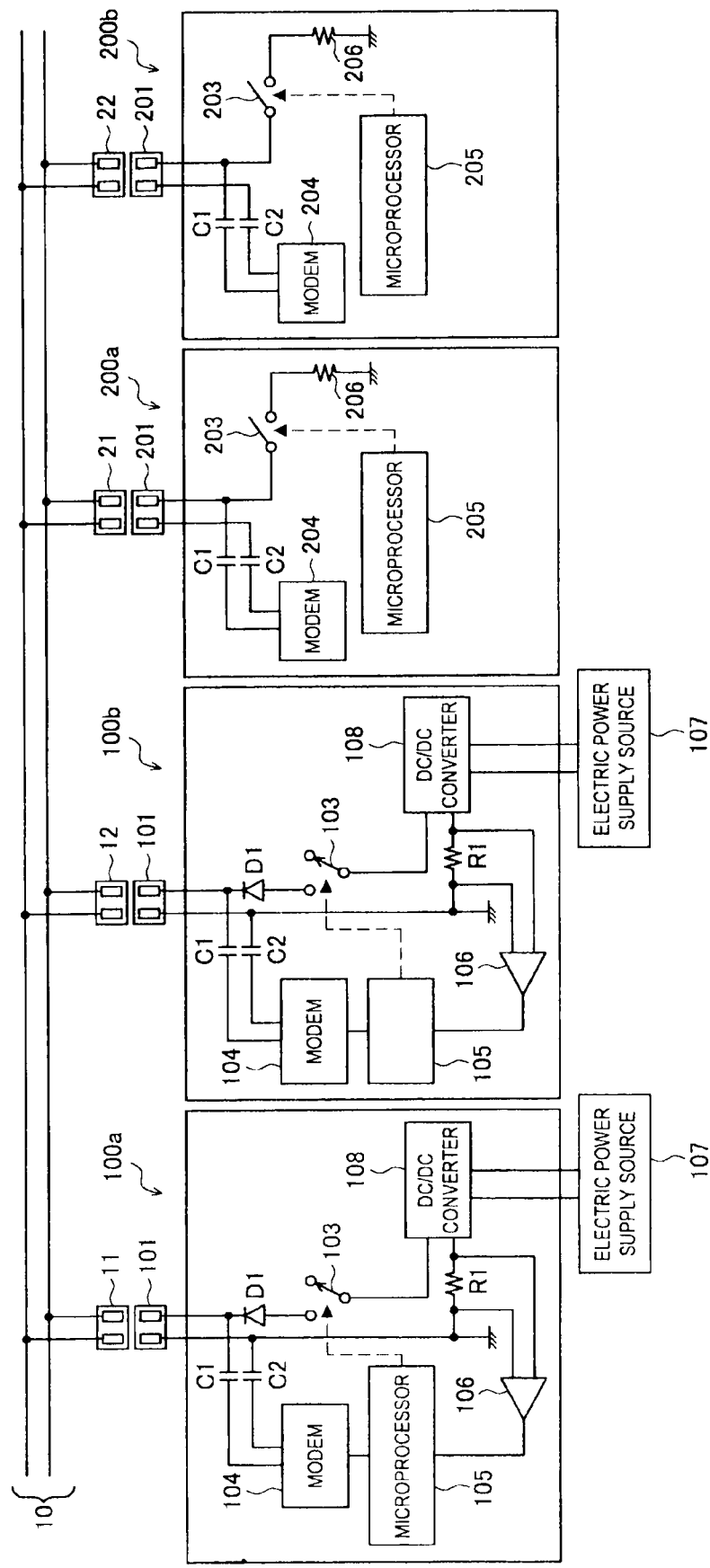
FIG. 6 is an explanatory figure that shows an operation of the electric power supply system according to the embodiment of the present invention.

For example, in the electric power supply system 1 shown in FIG. 6, it is assumed that, currently, the supply of electric power is being performed at the voltage V1 between an electric power supply server (the electric power supply server 100a in this case) and a client (a client 200a in this case). Here, a new client (a client 200b in this case) is connected to a connector 22, and the new client is thereby connected to the bus line 10. When the client 200b requires electric power, the client 200b makes a request to the existing electric power supply server and client that are connected to the bus line 10 concerning whether the voltage of the electric power supplied between them can be changed. However, if the voltage change is refused by the existing electric power supply server and client, the client 200b has to accept that the electric power cannot be supplied. This is because, although it is assumed that the client that is connected to the electric power supply system 1 according to the present embodiment can basically correspond to various voltages, it is also necessary for the electric power supply system 1 according to the present embodiment to accept a client with a small input voltage range.

When the electric power at the current voltage V1 can be supplied to the client 200b that is newly connected to the electric power supply system shown in FIG. 6, the client 200b sequentially performs an electric power supply negotiation with each of the electric power supply servers currently existing in the electric power supply system 1.

On the other hand, when the voltage can be changed, each of the electric power supply servers evaluates whether or not the current requested by the client 200b can be supplied after the voltage change. When the current requested by the client 200b can be supplied, first, the voltage between the existing electric power supply server and client is changed. It is assumed that, due to this change, the voltage is changed from V1 to V2. Note that, if the electric power consumption of the client 200a that has been supplied with electric power until then is constant, the current value between the electric power supply server and the client that have been transmitting and receiving electric power is also changed due to the voltage change.

Here, let us consider operation conditions when the client 200b is newly connected to the electric power supply system 1. Four patterns are conceivable for the operation conditions when the client 200b is newly connected to the system.

First operation condition: a case where the electric power supply server 100a can supply electric power at the voltage V1

If the electric power supply server 100a can supply electric power to the two clients 200a, 200b at the voltage V1, electric power is simply simultaneously supplied to the two clients from the one electric power supply server.

Second operation condition: a case where, at the voltage V1, the current of the electric power supply server 100a is insufficient and the electric power supply servers 100a, 100b supply electric power If the client 200b that is newly connected to the system can operate at the voltage V1, the client 200b starts the electric power supply negotiation with each of the electric power supply servers. In this state, if the additional supply of electric power is rejected by the electric power supply server 100a and the supply of electric power from the electric power supply server 100b is possible, the electric power supply servers 100a, 100b perform a parallel operation, and start the supply of electric power to the two clients 200a, 200b.

Third operation condition: a case where the supply of electric power is possible by the electric power supply server 100a just changing the voltage First, if the current requested by the client 200b cannot be supplied while the voltage V1 supplied by the electric power supply server 100a is maintained, but the request from the client 200b can be satisfied by changing the voltage of the electric power supplied by the electric power supply server 100a from V1 to V2, it is checked whether or not it is possible to change the voltage between the client and the electric power supply server, between which the supply of electric power is being performed. When it is possible to change the voltage, the voltage of the electric power supplied by the electric power supply server 100a is changed from V1 to V2, and, the electric power is supplied from the electric power supply server 100a to the clients 200a, 200b.

Fourth operation condition: a case where the electric power supply servers 100a, 100b supply electric power after changing the voltage of the electric power supply server 100a In a state where the voltage V1 has been negotiated between the electric power supply server 100a and the client 200a, if the client 200b requests that the voltage be changed to the voltage V2 and the electric power supply server 100a and the client 200a can operate at the new voltage V2, the voltage between the electric power supply server 100a and the client 200a is changed from the voltage V1 to the voltage V2. This voltage change is performed for the purpose of conforming to the voltage specification of the client 200b that is newly connected to the system. In this state, the electric power supply server 100a does not have enough capacity to supply electric power to the client 200b. However, if the electric power supply server 100b has enough capacity to supply electric power to the client 200b, the client 200b negotiates with the electric power supply server 100b to set the voltage V2. When the negotiation is completed, electric power transmission is performed from the electric power supply server 100b to the client 200b such that the electric power transmission is superimposed on the current supply between the electric power supply server 100a and the client 200a.

When the client 200b is newly connected to the system in this manner, essentially, there is no difference from a current addition request by the client 200 shown in FIG. 5. Accordingly, it can be found that the electric power supply system 1 according to the present embodiment can also cope with the increase or decrease of the client to the system.

Figure 7:
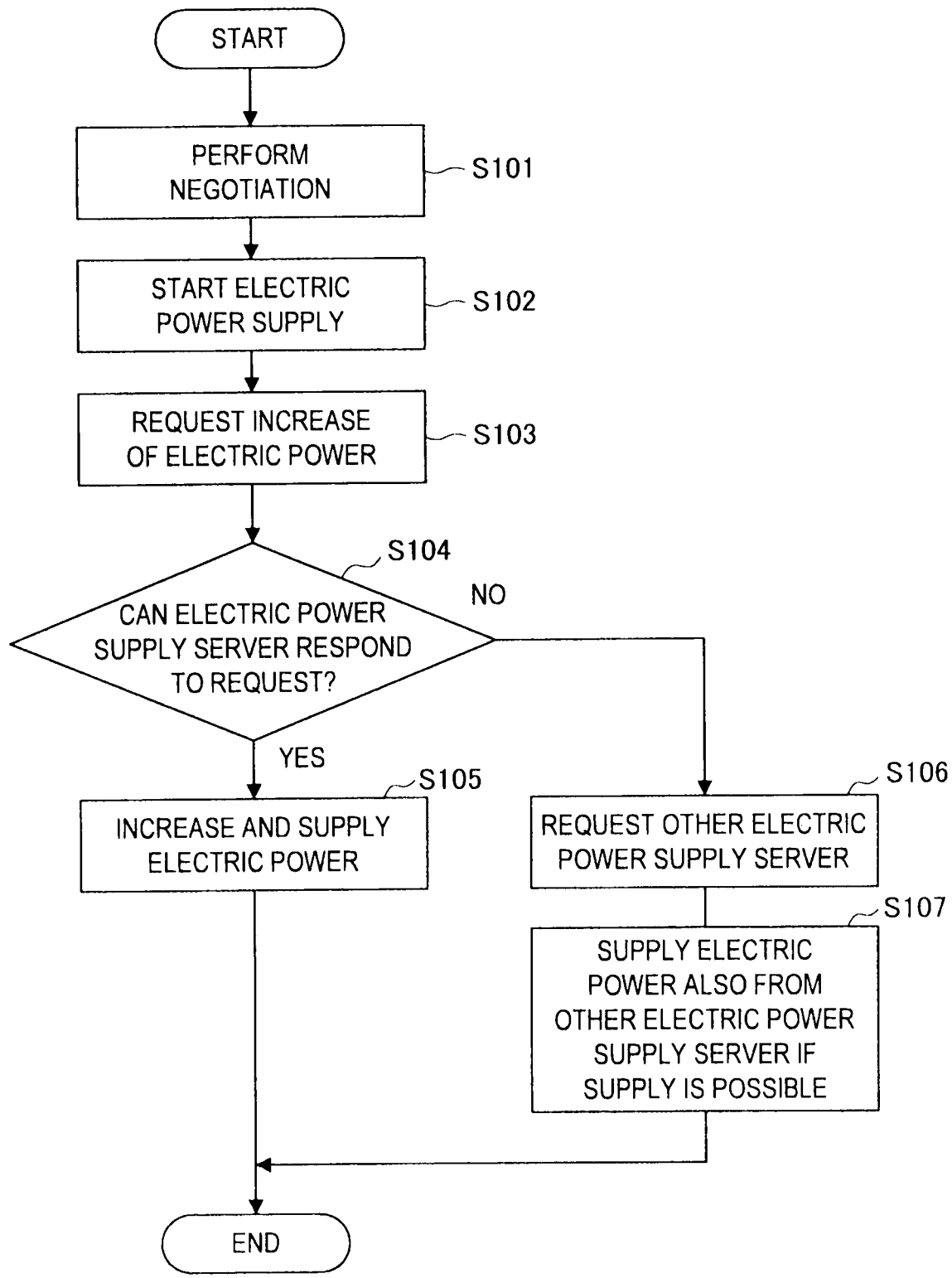
FIG. 7 is a flowchart that shows the operation of the electric power supply system according to the embodiment of the present invention.

FIG. 7 is a flowchart that shows the operation of the electric power supply system 1 according to the embodiment of the present invention. Hereinafter, the operation of the electric power supply system 1 according to the embodiment of the present invention will be explained again using FIG. 7.

When the client 200 is connected to the bus line 10 in a state where the plurality of electric power supply servers 100a, 100b are connected to the bus line 10 and the selection of the synchronous server is completed between the electric power supply servers 100a, 100b, the client 200 negotiates with the electric power supply server (the electric power supply server 100a, for example) that satisfies the request of the client 200 itself (step S101).

When the negotiation between the electric power supply server 100a and the client 200 is completed and the electric power can be supplied from the electric power supply server 100a, the electric power supply server 100a starts the supply of the electric power (step S102). The client 200 receives the electric power from the electric power supply server 100a and consumes the electric power.

After that, if the current capacity of the client 200 is insufficient, the client 200 requests the electric power supply server 100a to supply electric power to compensate for the insufficient amount of electric power (step S103). The electric power supply server 100a that has received the request from the client 200 determines whether or not it can respond to the request from the client 200 (step S104).

As a result of the determination by the electric power supply server 100a at the above-described step S104, when the electric power supply server 100a can respond to the request from the client 200, the electric power supply server 100a increases electric power and supplies electric power to the client 200 in accordance with a new electric power specification (step S105). On the other hand, as a result of the determination at the above-described step S104, when the electric power supply server 100a cannot respond to the request from the client 200, the client 200 requests the other electric power supply server (the electric power supply server 100b) to supply the electric power to compensate for the insufficient amount of electric power (step S106). When the electric power supply server 100b can supply electric power to compensate for the insufficient amount of electric power, the electric power supply server 100b supplies the electric power to the client 200 (step S107).

In this manner, with the electric power supply system according to the present embodiment, it is possible to flexibly supply electric power from the electric power supply server in accordance with the request of the client 200.

In the electric power supply system according to the present embodiment, at least one electric power supply server and at least one client exist, and the voltage when the supply of electric power is started is determined by negotiation between the electric power supply server and the client. For example, if the profile of the electric power supply server is set such that the output voltage is in a range of V1 to V2 and the profile of the client is set such that the request voltage is in a range of V3 to V4, there is no common voltage range between the range of V1 to V2 and the range of V3 to V4. In this case, supply of electric power from the electric power supply server is not possible. It is desirable to design the electric power supply server and the client such that this common voltage range is as large as possible. However, there is no need to cover all the voltage range allowed by the electric power supply system according to the present embodiment. A minimum requirement for the electric power supply server and the client is that the voltage resistance of devices (particularly, a main switch) of the electric power supply server and the client etc. is higher than the maximum voltage that is expected to be applied in the electric power supply system.

Note that the setting of the voltage level that is agreed between the electric power supply server and the client is determined by design requirements, and it is not relevant to the protocol used in the electric power supply system. In other words, the level at which the voltage agreed between the electric power supply server and the client is set depends on the electric power supply server that supplies electric power and the client that consumes the electric power.

The voltage that is agreed between the electric power supply server and the client is unclear until the negotiation is completed. However, when the negotiation is completed, the supply of electric power from the electric power supply server is started at a certain voltage Vx. If another client is connected to the electric power supply system in this state, the voltage and current of the electric power are changed to a voltage and current at which a total electric power capacity to satisfy all the clients can be supplied from the electric power supply server. This is because the electric power supply server and the client dynamically change the voltage and current of the electric power to be supplied. In this manner, the electric power supply server and the client attempt as far as possible to supply the electric power when the supply amount is increased or decreased or the load capacity is increased or decreased.

If a currently used AC grid system is compared with the electric power supply system according to the present embodiment, the AC grid system just changes the current in order to increase or decrease the total amount of electric power while maintaining the voltage at as constant a value as possible. On the other hand, the electric power supply system according to the present embodiment is different in that both the voltage and current can be changed in order to change the total amount of electric power.

The reason why the voltage is not set to a certain value, in other words, the reason why the voltage is not set to a value in the vicinity of a maximum allowable voltage of the electric power supply system is as follows. In the electric power supply system according to the present embodiment, it is desirable that the degree of freedom of each device is as large as possible. Only the voltage resistance is required and the degree of design freedom is ensured in terms of the actual allowable voltage range of the client. Thus, the voltage is not set to a certain value from the beginning, and the specification is made such that conditions specific to each device can easily be reflected. As a result, it is expected that a very wide variety of types of voltage devices can be incorporated.

In the electric power supply system according to the present embodiment, an operating voltage of the bus line converges to a voltage in the vicinity of the voltage of the client that requests a minimum voltage, among the clients that are connected to the bus line. Of course, if the client that requests the minimum voltage is disconnected from the bus line and an electric power situation becomes critical, the operating voltage of the bus line changes to the voltage of the client having the minimum voltage among the remaining clients.

Next, the operation of the electric power supply server will be explained. It is necessary for the output electric power of the electric power supply server to have a range that is as wide as possible. Also, it is necessary for the output electric power to be set to a voltage that is close to the voltage value requested by the client. On the other hand, when the client requests electric power as a current value, a current detection function and a bus line voltage detection function are necessary in order to supply the electric power to the client. An existing technology can be used to provide these functions.

In summary, the key features of the electric power supply server according to the present embodiment are as follows: a voltage and current setting function of the electric power supply server is designed such that the voltage and current are dynamically set under a certain protocol through a communication channel; a synchronous server can be selected between a plurality of servers; and if the electric power supply server operates as a synchronous server, it can perform synchronization and management of another server and a client. In addition, the following point is also one of the key features of the electric power supply server according to the present embodiment: an initial value of the supply voltage of the electric power supply server is determined when a client existing on the bus line is first found.

In the known electric power supply server proposed in Japanese Patent Application Publication No. JP-A-2008-123051, a system is used in which an appropriate number of profiles are prepared as output specifications of the electric power supply server. Further, in the known electric power supply server proposed in Japanese Patent Application Publication No. JP-A-2008-123051, the profile is dynamically selected for the client that becomes an electric power supply target.

On the other hand, in the electric power supply server according to the present embodiment, the output is set to cover a predetermined range, and the specification is set such that a request that is beyond the predetermined range to be covered is not responded to. Therefore, the concept of the profile switching corresponding to the client that becomes an electric power supply target is not necessary. Note that the electric power supply server according to the present embodiment can quickly respond to the request of the client, by assigning numbers to certain output conditions set at a certain time point and storing the numbers. Therefore, in the electric power supply server according to the present embodiment, the profile may also be used in a similar manner to the electric power supply server proposed in Japanese Patent Application Publication No. JP-A-2008-123051.

When an electric power supply server is newly added to the electric power supply system for which initialization has already been completed, the electric power supply server operates in the following manner, for example.

It is desirable that the newly added electric power supply server holds, as data, at least an output voltage range that is variable, and an output current value corresponding to the output voltage range. When the electric power supply server is connected to the existing bus line, the electric power supply server first registers the existence of the server itself in the synchronous server. At this time, the supply of electric power is not performed from the newly added electric power supply server, and this electric power supply server waits to start the supply of electric power. If, from among the clients that are connected to the existing bus line, a client that requests electric power does not additionally connect, the newly added electric power supply server does not have an opportunity to supply electric power. However, for effective use of the electric power supply system according to the present embodiment, it is desirable to avoid losing the opportunity to supply electric power from the electric power supply server. In a case where there is no opportunity for the newly added electric power supply server to supply electric power, if an electric power storage device is provided in a device that is connected to the bus line, the electric power supply system operates effectively. More specifically, when each client of the electric power supply system is fully supplied with electric power, if electric power is not fully stored in the electric power storage device provided in each device, each client charges the electric power storage device. Thus, each client can use the electric power storage device as an electric power supply source when the electric power specification is increased.

Accordingly, it is desirable that the client that is connected to the bus line is designed such that it is, as far as possible, in an electric power "starved state," namely, such that there is a demand for electric power. For this purpose, in the case of a client having a secondary battery, for example, it is desirable that the client transmits a charging request to the electric power supply server to charge the secondary battery when the client is not operating. In this case, current requests of the client itself may be prioritized. In other words, the present electric power request from the client may include, as parameters, a primary request and a secondary request etc.

Adjustment processing of the priority order for the electric power between the plurality of clients is not described here in detail. A parameter that expresses the weighting of the demand for electric power of each of the clients may be incorporated in the power specification of the client that is to receive electric power. The parameter may be managed by combining the priority of the client itself and the priority in the electric power supply system. The priority in the electric power supply system may be manually set using a monitor device (not shown in the drawings) that is provided in advance in the electric power supply system. If the priority in the electric power supply system is set to an initial value (for example, 0), the respective clients connected to the electric power supply system are treated as equals.

In this manner, the electric power supply system includes the client(s) in an electric power "starved state," namely, in a state where there is a demand for electric power, and the electric power supply server(s) that have a limited supply capacity. Thus, the electric power supply system can constantly operate at its maximum capacity. As a result, the electric power supply system operates in a temporally smooth manner. More specifically, it is desirable that the electric power supply system is constantly operated such that all the requests from the client(s) cannot be satisfied. The state where a particular client request cannot be satisfied can be notified to the user by just adding an appropriate display element to each of the clients. Moreover, the adding of the display element makes it possible to notify the user about the type of situations in which it is necessary to add an electric power supply server. Thus, each of the electric power supply servers can constantly operate in a minimum energy environment, which in turn is effective to reduce total energy.

One of the features of the electric power supply system according to the embodiment of the present invention is that electric power is supplied without interruption between a particular electric power supply server and a particular client between which electric power is supplied and received. In the present invention, a system may be used in which some voltage is constantly generated on the bus line and thus the supply of electric power to the client is not completely interrupted.

For example, in the electric power supply system having the configuration shown in FIG. 5, the electric power supply server selected as the synchronous server may not produce a time slot. In this case, the synchronous packet serving as a marker of the time slot is used to monitor the system state or update the system state (information about the number of the electric power supply servers and the clients), rather than to synchronize the devices connected to the system.

In this case, when the initialization (the selection of the synchronous server) of the electric power supply system is completed and one synchronous server is selected, the synchronous server may start to output default electric power to the bus line. Accordingly, the electric power supply server and the client that are newly connected to the electric power supply system can obtain the electric power to start themselves up from the electric power output by the synchronous server. At this time, in terms of voltage resistance, it is desirable that the electric power supply server and the client that are newly added to the electric power supply system do not fail when they are physically connected to the electric power supply system. However, actually, in order for the electric power supply server and the client that are newly added to the electric power supply system to use the voltage existing on the electric power supply system, it is desirable that the voltage is clamped using an electric power supply circuit formed by an appropriate impedance, and that the electric power supply server and the client start operation by obtaining the electric power from the electric power supply circuit after the voltage is clamped. Note that the voltage clamp is achieved using a resistor and a zener diode. After the electric power supply server and the client have started operation, it is desirable that the electric power supply circuit used for the start up is disconnected. Further, the default value of the electric power may be 5V, 500 mA, as supplied by a currently available universal serial bus (USB). The default value may be totally determined for the entire system. With respect to at least the voltage, a certain range may be supported in order to improve flexibility of the specification.

When the synchronous server does not produce a time slot, the electric power supply processing between the electric power supply server and the client is performed in the same manner as when the synchronous server produces a time slot. More specifically, it is assumed that, between the electric power supply server 100*a* and the client 200 shown in FIG. 5, an agreement is made that electric power is supplied at a voltage V1 (volt) and a current I1 (ampere) from a certain time. In this case, the electric power supply serer 100*a* starts the supply of the electric power to the client 200 from the agreed certain time. Then, as described above, the electric power from the electric power supply servers 100*a*, 100*b* can be flexibly changed in accordance with an increase or decrease of the electric power consumption of the client 200 and in accordance with addition of a new client that is connected to the bus line 10.

2. Conclusion

As explained above, according to the embodiment of the present invention, when electric power is supplied from the electric power supply server to the client, electric power constantly exists on the bus line. Therefore, an electric power storage device can be removed from the client, and simplification and cost reduction of the client can be achieved. Further, because electric power constantly exists on the bus line, the electric power for the initial operations of the electric power supply server and the client can be obtained from the electric power on the bus line. As a result, an electric power storage device for the initial operations becomes unnecessary, and it is therefore possible to simplify the configurations of the electric power supply server and the client. Furthermore, when the synchronous server produces a time slot, the system of the electric power supply bus system proposed in Japanese Patent Application Publication No. JP-A-2008-123051, for example, can be used as it is. In addition, flexible electric power supply is achieved such that, during some time periods, electric power supply is continuously performed for a long time from the electric power supply server to a particular client, and during other time periods, electric power supply is intermittently performed from the electric power supply server to a lot of clients.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-270642 filed in the Japan Patent Office on Nov. 27, 2009, the entire content of which is hereby incorporated by reference.

What is claimed is:

1. An electric power supply device comprising:
   an electric power supply portion operable to continuously supply, to a first device with which an agreement about electric power supply has been made, electric power agreed with the first device until a time at which the agreement becomes unnecessary, the electric power being supplied via a bus line; and
   an information communication portion operable to transmit and receive an information signal indicating information to and from the first device, wherein the information signal is superimposed on the electric power supplied from the electric power supply portion,
   wherein the electric power supply portion determines whether to change the electric power to be supplied, in accordance with a connection of a second device to the bus line,
   wherein the electric power supply portion determines whether to change the electric power when the second device is disconnected from the bus line.

2. The electric power supply device according to claim 1, wherein the electric power supply portion determines, with the first device with which the agreement has first been made, an initial voltage and current of the electric power to be supplied, and
   wherein when the second device is connected to the bus line and an agreement on electric power supply is made with the second device, the electric power supply portion transmits electric power agreed with the second device such that the electric power agreed with the second device is superimposed on the electric power agreed with the first device.

3. The electric power supply device according to claim 1 further comprising:
   a detection portion that detects voltage and current of the bus line.

4. The electric power supply device according to claim 1, further comprising a current backflow prevention portion that inhibits backflow of current to the electric power supply portion.

5. The electric power supply device according to claim 1, wherein the electric power supply portion supplies the electric power agreed with the first device in an electric power supply time interval that is determined in advance and periodically repeated.

6. An electric power supply method, comprising:
   in a electric power supply device:
   continuously supplying, to a first device with which an agreement on an electric power supply has been made, electric power agreed with the first device until a time at which the agreement becomes unnecessary, the electric power being supplied via a bus line; and
   transmitting and receiving an information signal indicating information to and from the first device, wherein the information signal is superimposed on the electric power supplied,
   wherein the electric power supply device determines whether to change the electric power to be supplied, in accordance with a connection of a second device to the bus line, wherein the electric power supply device determines whether to change the electric power when the second device is disconnected from the bus line.

7. An electric power supply system comprising:
   a first electric power supply server that supplies electric power; and
   a first client that receives the electric power supplied from the first electric power supply server,
   wherein the first electric power supply server comprises an electric power supply portion that continuously supplies, to the first client with which an agreement on electric power supply has been made, electric power agreed with the first client until a time at which the agreement becomes unnecessary, the electric power being supplied via a bus line, and
   an information communication portion that transmits and receives an information signal indicating information to and from the first client, wherein the information signal is superimposed on the electric power supplied from the electric power supply portion, and
   wherein the electric power supply portion determines whether to change the electric power to be supplied, in accordance with connection of a second electric power supply server or a second client to the bus line, wherein the electric power supply portion determines whether to change the electric power when the second client is disconnected from the bus line.

8. The electric power supply device according to claim 1, wherein the electric power supply portion determines whether the electric power supply portion is capable of supplying the electric power requested by the second device, denying the electric power supply to the second device when the electric power cannot be supplied.

9. The electric power supply device according to claim 1, wherein the electric power supply portion determines whether the electric power supply portion is capable of supplying the electric power requested by the second device, denying the electric power supply to the second device based on determining that the electric power requested by the second device cannot be supplied.

10. The electric power supply method according to claim 6, wherein the electric power supply device determines, with the first device with which the agreement has first been made, an initial voltage and current of the electric power to be supplied, and
    wherein when the second device is connected to the bus line and an agreement on electric power supply is made with the second device, the electric power supply device transmits electric power agreed with the second device such that the electric power agreed with the second device is superimposed on the electric power agreed with the first device.

11. The electric power supply method according to claim 6, wherein the electric power supply device supplies the electric power agreed with the first device in an electric power supply time interval that is determined in advance and periodically repeated.

12. The electric power supply system according to claim 7, wherein the electric power is supplied from the first electric power supply server such that a dead time interval is not generated.

13. The electric power supply system according to claim 7, wherein the first electric power supply server negotiates with the first client that requires electric power.

14. The electric power supply system according to claim 13, wherein when the first electric power supply server has completed the negotiation with the first client that requires the electric power, the electric power supply server supplies electric power to the client without interruption.

* * * * *